United States Patent [19]
Olsen et al.

[11] Patent Number: 4,743,752
[45] Date of Patent: May 10, 1988

[54] FIBER OPTIC REMOTE SENSOR

[75] Inventors: Everett O. Olsen; Christopher R. Brown, both of Wrentham; Gordon W. Chitty, Norfolk, all of Mass.

[73] Assignee: The Foxboro Company, Foxboro, Mass.

[21] Appl. No.: 8,209

[22] Filed: Jan. 28, 1987

Related U.S. Application Data

[63] Continuation of Ser. No. 607,532, May 7, 1984, abandoned.

[51] Int. Cl.$^4$ ............................ G01D 5/28; G01L 1/10
[52] U.S. Cl. ................................ 250/227; 250/231 R; 250/231 P; 73/862.59
[58] Field of Search ............... 250/227, 231 R, 231 P; 73/862.41, 862.42, 862.59, 653, 704, 705, 708, 717, 702, 765, 766; 455/605-607, 610, 612

[56] References Cited

U.S. PATENT DOCUMENTS

| | | | |
|---|---|---|---|
| 4,345,482 | 8/1982 | Adolfsson et al. | 250/227 |
| 4,417,140 | 11/1983 | Adolfsson et al. | 250/227 |
| 4,470,313 | 9/1984 | Kalinoski et al. | 73/862.59 |
| 4,517,456 | 5/1985 | Halsall et al. | 250/227 |
| 4,521,684 | 6/1985 | Gilby et al. | 250/227 |

FOREIGN PATENT DOCUMENTS

| | | | |
|---|---|---|---|
| 0161671 | 11/1985 | European Pat. Off. | |
| 239823 | 3/1969 | U.S.S.R. | 73/862.59 |

Primary Examiner—Edward P. Westin
Attorney, Agent, or Firm—Terrence (Terry) Martin; Jack H. Wu

[57] ABSTRACT

An optically driven, electromagnetically oscillating resonant sensor subjected to a stress force wherein the optical driving energy and the optically communicated signal generated in response to the stress force are both communicated a substantial distance along a single optical fiber. A portion of the supply energy drives the oscillatory mechanism and a portion is reflected to a frequency detector by the shuttering action of the resonant element. The device may be configured so as to be electrically driven and optically sensed, optically driven and electrically sensed, or both optically driven and optically sensed for maximum retrofit versatility in past, present, and future process control systems.

34 Claims, 10 Drawing Sheets

FIBER OPTIC REMOTE SENSOR

This is a continuation of application Ser. No. 607,532 filed 5-7-84, now abandoned.

BACKGROUND OF THE INVENTION

The present invention relates to the field of fiber optic based communications and measuring apparatus, and more particularly to light stimulated, oscillating resonant element apparatus for measuring physical parameters.

Certain definitions are required for clarity and to facilitate understanding of the present invention. As used herein, "radiant energy" includes both coherent and incoherent energy of a wavelength between 1000 and 100,000 Angstroms, and specifically including infrared, ultraviolet, and visible light energy. Such radiant energy may be described as "steady" or "continuous wave" ("CW") in order to distinguish it from radiant energy signals which are modified to carry information. "Modulation" is used broadly herein, and it is intended to mean a process of modifying some characteristics of a carrier so that it varies in step with the instantaneous value of another signal and, specifically, amplitude modulation. The "steady" radiant energy denominated herein refers to radiant energy having substantially constant intensity levels; i.e., absent short term variations in intensity and having a substantially unchanging spectral distribution. In referring to light signals which carry information, the terms "shuttered" and "interrupted" are used to refer to modulated light as well as the mechanism by which the modulation takes place. "Fluid" includes gases and/or liquids. The term "silvered" is used generically herein to describe a reflective metallization coating, or its equivalent. "Partially silvered" is used to describe such a coating having transmission and reflection characteristics, which may be high in ratio, one to the other. The term "force" is used to describe any physical parameter or phenomena capable of moving a body or modifying its motion, and specifically includes pressure and any parameter or phenomena capable of conversion to pressure. "Motor" is used in its broader sense, i.e., denominates a device that moves an object. The term "transducer" is used to describe a device to convert energy from one form to another, and as used herein, the terms "opto-electric transducer" and "electro-optic transducer" more specifically describe the class of devices useful for converting radiant energy to electrical energy, and electrical energy to radiant energy. "Cantilever beam" refers to that class of mechanical or other sensors in which a beam element is attached by one of its ends and which may be resonated. Such cantilever beam elements may be hollow, in which event they are denominated "resonant hollow beam" elements or structures.

As the advantages of fiber optic based communication and control of industrial processes become better known, increasing emphasis is being placed on various methods of simple, inexpensive, and reliable communication of low level radiant energy via fiber optics to the sensor site for making the desired measurement, and returning the measurement information on fiber optic paths to the control and measurement location. Among the many problems facing designers of such process control systems are the need for few, low light level optical paths and methods of accurately and reliably carrying out the measurements in such a way that the derived measurement information may be accurately communicated by means of fiber optic signals.

It is well known that the resonant frequency of a taut wire is a function of the tension on the wire. It is also recognized that a force measuring instrument can be based on this relationship, by causing the wire to vibrate while tensioned by an unknown force applied thereto and measuring the vibration frequency, as in U.S. Pat. No. 4,329,775. Similarly, it is known that by subjecting the interior of a vibrating hollow beam structure to pressure variations, the resonant frequency thereof is caused to vary in relation to the pressure variations. In the field of fiber optic technology, it is known that a vibrating element partially blocking the light pathway in a periodic manner between two aligned fiber optic elements will "shutter" the light passing along the second fiber optic element.

It is also known that a steady light beam can be directed down a first fiber optic element, modulated (for example, acoustically), and returned to a point adjacent its source via a second fiber optic element (U.S. Pat. Nos. 4,345,482 and 4,275,295). It has very recently been alleged that a vibrating wire element can be driven by sending a pulsating light down a first optical fiber element, passing a steady light beam down a second fiber optic element to a point where the vibrations modulate the steady light, and the frequency of the vibrations detected by reflecting the modulated light back along a third fiber optic element path. The modulation frequency might then be measured. Changed tension on the vibrating wire may cause the returned light energy to vary regularly with the tension on the wire [Jones, B. E. and G. S. Philp, "A Vibrating Wire Sensor with Optical Fibre Links for Force Measurement", Paper No. 05.1, *Sensors and Their Applications,* UMIST Manchester (UK) 20–22 Sept. 1983].

The proposal of Jones and Philp is illustrated in FIG. 2. In their suggested apparatus, thin wire is stretched between an anchor post and a pressure diaphragm. The wire is disposed between the poles of a permanent magnet and its two nodes are electrically connected, via a matching transformer, to photodiode 1. If light of alternating intensity is passed via an optical fiber to the photodiode, and an alternating current is driven through the wire, then it moves in a plane perpendicular to that defined by the current and the magnetic field at a frequency equal to that of the intensity fluctuations. The movement of the wire is sensed by two optical fibers placed in parallel and adjacent in the plane of the movement. The first of these two fibers is fed with light of nominally constant intensity from LED 2 in the control unit, and this light on leaving the fiber at the sensing head, illuminates the wire. Some light is reflected back into the second fiber and is returned to the control unit. The intensity of this returned light is a function of the position of the wire relative to the fiber ends. Therefore, as the wire vibrates, alternating light intensity in phase with the oscillation is returned to the control unit by the second fiber. This signal is electrically amplified in the control unit and a portion of the electric output used to drive LED 1 in phase and in resonance with the wire; a third optical fiber carries this in-phase light signal to the sensing head where it is converted into oscillatory driving power to sustain oscillation.

These and prior methods of remote detection and communication by fiber optic means generally require multiple light pathways, complex circuitry, and/or independent sources of oscillation energy for the resonant member.

SUMMARY OF THE INVENTION

The invention relates to the discovery that a single steady radiant energy beam can be simultaneously shuttered and reflected by a vibratable or resonant element.

The present invention contemplates directing a steady radiant energy beam along a first communicating pathway to a radiant energy detector transducer element positioned adjacent a vibratable resonant element such that the resonant element periodically at least partially obstructs the path of radiant energy striking the resonant element, reflecting a portion of the steady radiant energy back along the same communicating pathway in the reverse direction when the resonant element obstructs the radiant energy path, and utilizing the detected radiant energy to cause the resonant element to sustain oscillation. That is, during periods when the resonant element is not obstructing the source radiant energy, the energy is permitted to reach a light-energy to electrical-energy transducer, generating an electrical current at the transducer output.

The electrical current is phase shifted according to known principles and used to initiate and sustain vibration of the resonant element. In a vibrating wire or ribbon version of the oscillator portion of the invention, the phase-shifted electrical current is applied in accordance with the known laws of electromagnetism to the ends of a tensioned wire or ribbon element suspended in a magnetic field, causing the wire or ribbon to being oscillating and continue oscillating at the resonant frequency of the wire or ribbon. In an alternate, resonant hollow beam version, the transducer output is phase-shifted and applied to an electrical-to-mechanical energy transducer in order to initiate and sustain oscillation. The periodically reflected radiant energy varies in intensity and in synchronism with the oscillating frequency of the resonant element. By including means to deflect a detectable portion of the oscillatory reflected radiant energy from the first steady radiant energy path along a second path to a remote detector, the frequency of the oscillatory radiant energy (and thus of the resonant element frequency) can be determined by conventional means. Exerting a force on the resonant element to vary the frequency thereof in relation to the magnitude of the force enables remote measurement of the force.

Of course, various physical phenomena can thus be measured by converting the physical phenomenon or parameter into a force applied as above. Examples of elongated devices suitable for use as resonant elements include tensioned wires or ribbon elements, double or single tuning forks, bells, other cantilever structures, and double cantilever devices.

In order to encode and communicate more information, the steady radiant (or light) energy input into the fiber optic pathway may be of either broad or specifically limited spectrum, and the light returned from the vibrating element may also be of either broad or specifically limited spectrum, thus providing great flexibility in communicating information along the single pathway. Other embodiments of the invention further comprehend, for example, at least a pair of separate resonators located within a confined space wherein each resonant element is configured to measure a different physical parameter. With two resonators and a single fiber optic pathway, the steady energy is communicated to both oscillating resonators and each reflected portion of the light is filtered at a different wavelength and then combined to be returned to a decoder along the same single fiber optic pathway. This filtering can be accomplished with conventional filters or with multiple layer coated reflective elements attached to the resonant element and positioned to reflect the wavelengthlimited light energy back along the fiber optic pathway. "Multiple layer coatings" as used herein are coatings made up of multiple layers of dielectric material having specific refractive indexes. Such coatings may be (spectrally) high pass, band pass, or low pass, depending on the arrangement of the layers, the selection of which lies within the skill of the ordinary optics artisan. At the decoder a beam splitter (or its equivalent) can be used to separate the shorter wavelength energy from the longer wavelength energy. The oscillation frequencies can then be measured to indicate the sensed physical parameters. A multitude of similar multiple-use configurations can be utilized, limited in combinations only by the different kinds of physical parameters to be measured and in number only by the ability to differentiate and discriminate among radian energy wavelengths. Some combination uses on a single optical fiber pathway according to this invention include frequency and out-of-range indication, position and limit stops, local or remote temperature and pressure, pressure and/or differential pressure and another variable, such as temperature, and so forth as required in the particular arrangement.

Therefore, it is an advantageous object of this invention to provide a method of measuring one or more physical phenomena at a location remote from the location where the signal is used or observed, and whereby the measurement signal is immune or resistant to nearly all ordinary environmental disturbances.

It is an advantage of this invention that a single fiber optic pathway can be used to carry both the oscillator source energy and the resonant oscillating signal.

Another advantage of the invention is that numerous kinds of physical parameters may be easily and accurately measured.

Still another advantage of this invention is the ability to carry a plurality of signal information energies and the oscillator source energies on a single fiber optic pathway.

It is another advantage of the present invention that since the encoded communication carried by the optical fiber is not greatly dependent on the radiant energy level, providing at least minimal adequate energy levels enables successful measurement even where optical amplitude noise of wide bandwidth is present.

Yet another advantage of the present invention is effectively total isolation and freedom from radio frequency interference (RFI).

Another advantage is the elimination of electrically conducting pathways between the sensor site and the control room which result in ground loop currents.

And still another advantage of the present invention is significantly reduced concern about electrical conductors carrying severe electromagnetic pulse energy into the electronics and control portions of the control system.

Another advantage of the invention disclosed herein is freedom from explosion hazards associated with electrical currents in critical environments.

And yet another advantage of the present invention is freedom from lightning induced hazards.

An advantage of one embodiment of the invention disclosed is that it is very easy to adapt to either optical or electrical connection, enabling even more versatility in adapting new technology to old control equipment and/or integrating or combining electrical and light energy technologies.

And yet another advantage of the invention is that the light signals may be readily multiplexed for multiple signal transmission on very few pathways.

Still another advantage of the invention disclosed herein lies in the fact that the oscillatory resonant element portion is reliably self-starting.

And yet another object of this invention is that it is readily adaptable to operation under difficult environmental conditions, such as corrosive environments.

Another advantage of the invention relates to its simple conceptual and design characteristics, in that costly, complex, inherently less reliable circuitry can be replaced cheaply, simply, and reliably.

And still another advantage of this invention is that measuring errors introduced due to path losses (such as fiber optic bending losses) are avoided since the measurement is frequency-based.

And another particularly advantageous object of this invention is that no local energy source is required at the remote measurement site to initiate or maintain oscillations.

Another advantage of the invention is that it may be easily and economically fabricated, calibrated, installed and set into routing operation.

And another advantage of the present invention is that being optically based, the field sensor has a minimal electronic content, i.e., the sensor unit requires no silicon-based amplifying devices.

Further objects and advantages of the invention are self-evident from the following detailed description of the preferred and alternate embodiments taken together with the accompanying drawings.

BRIEF DESCRIPTION OF THE DRAWINGS

Numerous features of the invention disclosed herein will be apparent upon examination of the several drawing figures forming a part hereof. Solid line arrows indicate steady or CW light energy direction of travel, while dotted line arrows indicate pulsating or modulated light direction. In all views, like reference characters indicate corresponding parts:

FIGS. 14A and 14B are timing/position diagrams in which FIG. 14B shows the correct relationship of the signal and feedback currents in the preferred embodiment of the invention, and FIG. 14A shows incorrect (i.e., shifted 90°) relationship.

DESCRIPTION OF THE PREFERRED EMBODIMENTS

Figure 1:
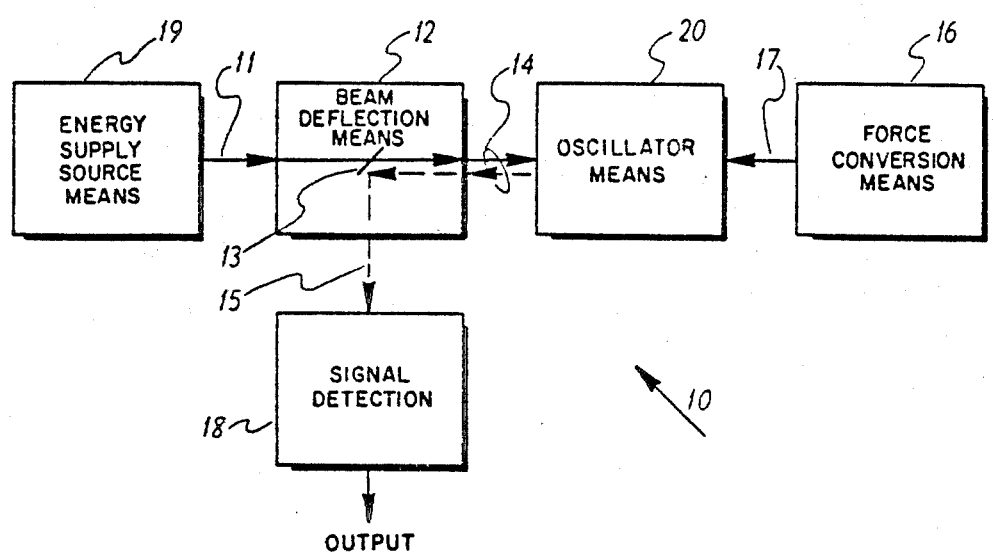
FIG. 1 is a simplified block diagram of the invention.
Figure 2:
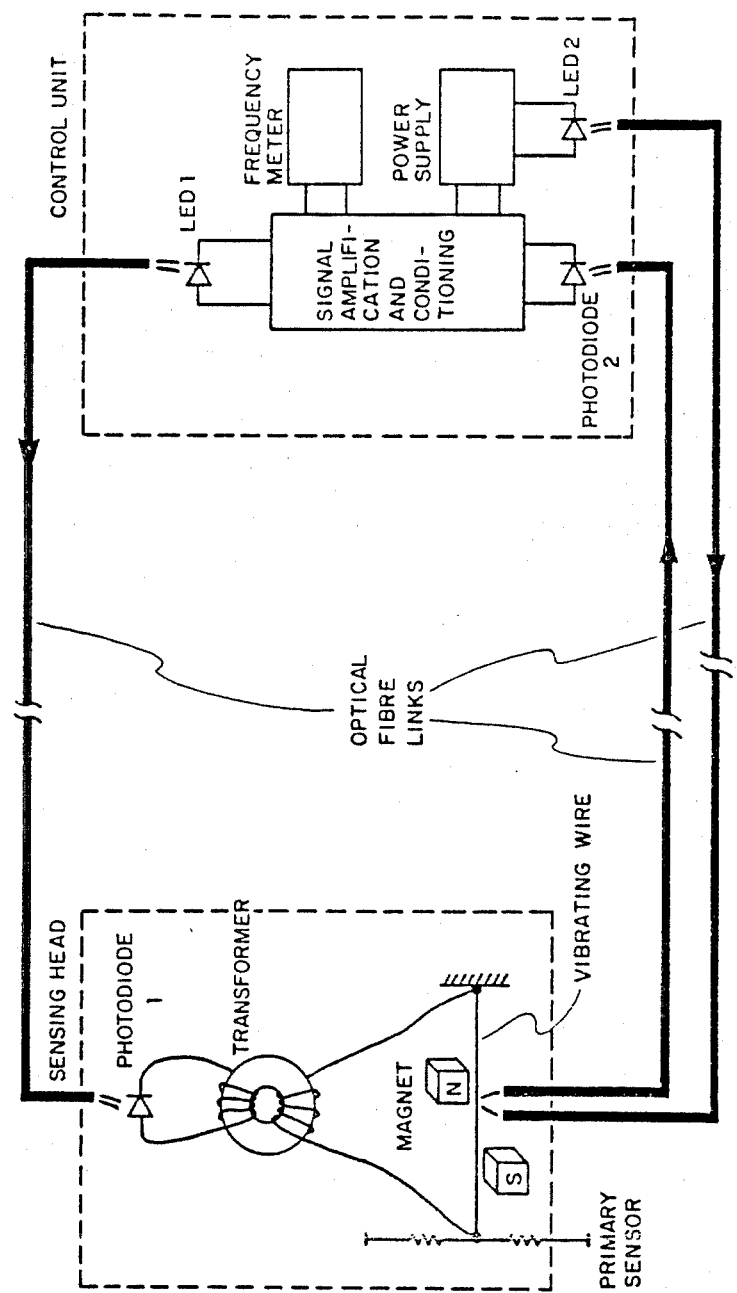
FIG. 2 is a basic diagram of the state of relevant work purportedly done at the approximate invention.

Referring now to the drawings, especially FIG. 1, there is shown an improved fiber optic remote sensor apparatus 10, including radiant energy supply source means 19, steady (or CW) radiant energy pathway 11, beam deflection means 12, including for example, reverse beam deflection/splitter 13, two-way radiant energy pathway 14, deflected pulsating radiant energy pathway 15, force conversion means 16 and communication means 17 to transfer the force to an oscillator means 20, and signal detection means 18.

For the purposes of this disclosure, energy supply source means 19 is a steady supply of radiant energy, including coherent or non-coherent light which is generally within the wavelength range of from about 1,000 to 100,000 Angstroms. The term "light" may be used in this disclosure to indicate the more generic term "radiant energy" within the above specified wavelength range. This steady energy is identified, for the purposes of this disclosure, as steady or continuous-wave (CW) energy in order to distinguish it from on-off, modulated, pulsating, or shuttered energy. In FIG. 1, this CW energy is coupled into steady radiant energy pathway 11 which may be a single fiber-optic light guide or the equivalent. A beam deflection means 12 to be described below, is located along the pathway 11 at a convenient control location remote from the physical magnitude measuring site. The pathway 11 enters deflection means 12 at a first location to conduct light energy thereinto, and a two-way radiant energy pathway conducts the light energy away from deflection means 12 from a second location thereof. Again, pathway 14 is a single fiber-optic light guide or the equivalent. Pathway 14 conducts CW light energy into oscillator means 20, containing a resonant frequency element, and which is described more completely below. A force conversion means 16 efficiently converts the physical magnitude to be measured into a mechanical force, which is applied to the resonant frequency element of oscillator means 20. The selection of the force conversion means from among the many schemes known to the art is within the ability of the skilled artisan and will vary depending on the physical phenomena to be measured. In brief, CW light received via sequential pathways 11 and 14 is reflected as light the intensity of which varies at a frequency dependent on the measured physical parameter, and is passed back along pathway 14 to reverse beam splitter 13 located in deflection means 12. Beam splitter 13 may be any of the known means for passing light when it is propagated therethrough from a first direction and deflecting a portion of the light propagated thereonto in the reverse direction. The deflected variable intensity (or pulsating) light is conducted along pathway 15 to signal detection means 18. The detector sensor 18, a light-energy to electric-energy transducer, may be any of several photosensors, including a photodiode, photovoltaic cell or element, or their equivalents.

In operation then, CW light is passed along a single, sequential path (11, 14) into an oscillator 20 which is powered by the CW light. A detailed description of this circuitry is included hereinafter in association with FIGS. 3 and 4. A force related to the physical parameter to be sensed is applied by force conversion and communication means (16, 17) to the resonant element within the oscillator 20 to cause a variable frequency pulsating light (related to the force) to be reflected along pathway 14 to a remote location where it is deflected (12, 13) into a detector 18 via a light path 15. The detector thus produces an output signal related to the physical parameter to be measured.

Figure 3:
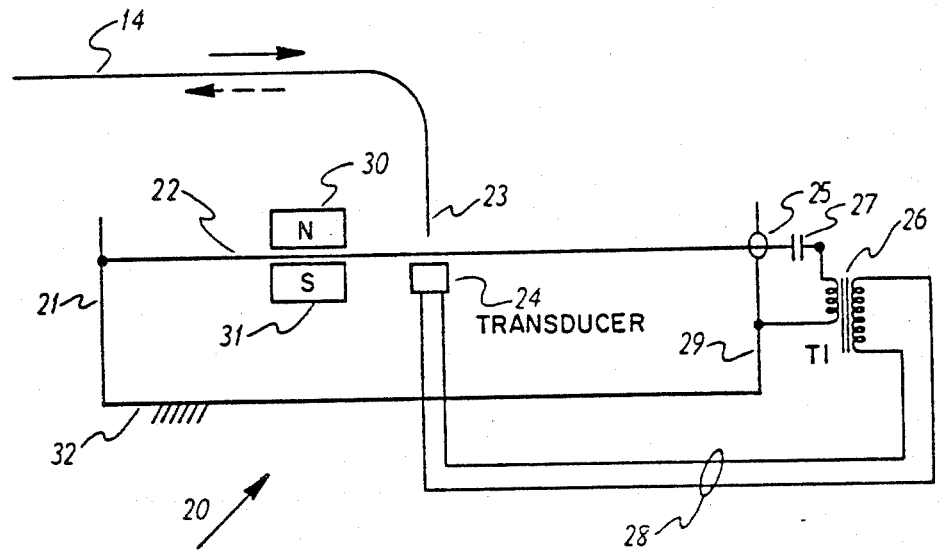
FIG. 3 is a simplified schematic view of the basic resonant wire oscillator sensor portion of the invention.

Turning now to FIG. 3, there is shown a simplified diagram of a basic embodiment of the oscillator means 20 portion of the remote sensing apparatus. It should be noted that while all necessary elements of the oscillator means 20 are included, they are shown and described in schematic form identifying general, rather than specific, details and arrangements. This is done in order to allow ordinary persons skilled in the art to make and use the invention according to their own specific needs.

The oscillator means 20 includes first end support structure 12, resonant element 22, fiber optic pathway termination 23, radiant energy to electrical energy transducer 24, insulator 25, transformer 26 or the equivalent, phase shift means 27, electrical interconnect means 28, second end support structure 19, magnetic field source means 30, 31, and frame 32.

The frame 32 is provided for assembly of the components, and is rigidly constructed. Attached to the frame 32 are resonant element 22 end supports 21, 29. In this example, a ribbon element is used as resonant element 22. Alternatively, other shapes or profiles may be used, including wires, tapes, or beam structures, which require a different physical arrangement, to be described hereinafter. A reflecting surface is included to reflect light when the resonant element 22 is "shuttering" the light. One end support structure 29 includes insulating means 25 to electrically isolate one end of the resonant element 22 from the frame 32. Light pathway 14 ends at termination point 23 adjacent the resonant element 22. A radiant energy to electrical energy transducer 24 is located on the opposite side of, and is partially blocked by, resonant element 22. Transducer 24 is electrically connected to transformer 26 via connecting wires 28. Other windings of transformer 26 include connections to a phase shift means 27, and to the ends of the resonant element 22 via the insulated end thereof and the frame 32 and opposite support 21. Magnets 30, 31 are equally displaced parallel to and on opposite sides of resonant element 22. For this example, magnet 30 is North and magnet 31 is South; the field may be reversed if desired, providing the laws of electromagnetism are properly observed. They are positioned so as to effect a magnetic field perpendicular to the resonant element 22 and also perpendicular to the direction of current flow in the resonant element 22 so as to cause resonant element 22 to move back and forth, interposed between the radiant energy source (termination point 23) and the transducer 24. In this configuration, transformer 26, phase stabilizer 27, connecting wires 28, and magnets 30, 31 comprise, in general terms, apparatus to cause vibration of the resonant element 22.

This mechanism is explained as follows. Radiant energy arriving at termination point 23 illuminates optoelectric transducer 24, generating voltage which is changed to a lower level by transformer 26. A phase shift circuit 27 shifts the phase angle of the motive current such that it exceeds 0° and remains less than 180° throughout the vibration frequency range of element 22 (see also FIG. 14). The phase shift circuit 27 is an impedance formed of at least one of the following reactances: capacitive, inductive, and/or resistive. The phase shifted current is applied to the ends of ribbon element 22, generating an electromagnetic field around the resonant element 22. Due to the interaction of the electromagnetic field and the fixed magnetic field around the ribbon from magnets 30 and 31, the resonant element 22 moves within the field, perpendicular to the beam of light from termination point 23. As the resonant element moves to block the radiant energy path between termination point 23 and opto-electric transducer 24, the current generated by the photocell is reduced, and when the resonant element 22 obstructs the radiant energy path, the radiant energy is reflected back along the same source pathway as the arriving energy. When the resonant element 22 sufficiently blocks the radiant energy path to substantially stop generation of current, the resonant element, being under tension, returns towards its rest position, unblocking the radiant energy pathway and the same action is repeated, thus resulting in sustained oscillation.

Figure 4:
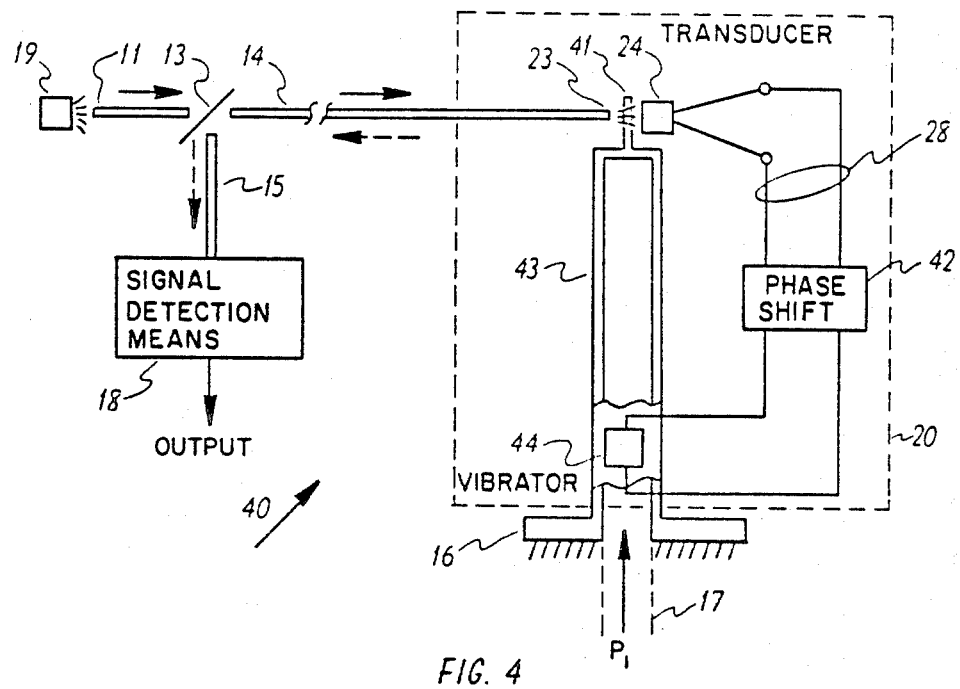
FIG. 4 is a simplified view of the basic resonant hollow beam oscillator sensor embodiment of the invention.

FIG. 4 shows a hollow cantilever beam fiber optic remote sensor apparatus 40, which includes an alternate embodiment of the oscillator means 20, shown within the dashed line box. This resonant cavity sensor includes steady (CW) radiant energy pathway 11, reverse beam deflection splitter 13, two-way radiant energy pathway 14, deflected pulsating radiant energy pathway 15, force conversion means 16, force conversion communication means 17, signal detection means 18, radiant energy source supply means 19, fiber optic pathway termination 23, radiant energy to electrical energy transducer 24, electrical interconnect means 28, interrupter 41, phase shift circuit 42, (hollow beam) resonant element 43, and vibrator means 44.

In the present configuration, the force conversion means 16 is inherent in resonant hollow beam element 43 when used to measure pressure, as the pressure supplied by force conversion communication means 17 stiffens (and therefore changes the resonant frequency of) resonant hollow beam element 43. The oscillator means 20 configuration details are slightly different than in FIG. 3. Oscillation of the hollow beam 43 is effected by vibrator means 44, which is an electromechanical device such as a piezoelectric crystal element, a bimorph cell (two crystal elements, such as Rochelle salts in rigid combination and arranged to act as a mechanical transducer), or the equivalent. The a.c. or pulsating electrical energy for driving the vibrator is derived from opto-electric transducer 24, which may be a photocell, photodiode, or the equivalent. At fiber optic pathway termination point 23, radiant energy is directed to adjacent transducer 24. Interposed between termination point 23 and transducer 24, and at least partially blocking the light path therebetween, is a mirrored, or reflective interrupter 41 attached to the end of the hollow beam resonant element 43. In order to maintain the correct phase relationship for reliable oscillation, the output of transducer 24 is subjected to a conventional phase shift circuit 42 before it is supplied to the vibrator 43 via electrical interconnect means 28 wires. The phase shift circuit 42 includes at least one of the following impedances: capacitive, inductive and/or resistance, as required to shift the phase angle of the motive current such that is exceeds 0° and remain less than 180° throughout the frequency range of element 43.

The physical arrangement of the oscillator elements 23, 41, 24, 43 and 44 is such that CW radiant energy is directed onto transducer 24 from termination point 23, and an electrical signal is generated which is phase shifted as necessary (see above) and supplied to vibrator means 44, which electro-mechanically causes resonant hollow beam element 43 to move from its stable position. Attached to the end of the resonant element 43 is an interrupter 41 disposed to interrupt the radiant energy pathway upon electromechanical deflection of resonant element 43. During interruption of the radiant energy, a mirrored or reflective portion of the interrupter reflects the radiant energy back along the pathway 14. During this period of decreased driving power, the resonant element 43 returns in the direction of its stable position until sufficient radiant energy is permitted to pass by the interrupter and again strike the transducer to generate vibrator driving power. Oscillations are thus initiated and sustained at the natural resonant frequency of the resonant hollow beam element. A pressure ($P_1$) change introduced via communication means 17 into the hollow beam cavity will vary the stiffness of the hollow beam thereby changing the oscillating frequency.

Still referring to FIG. 4, input power in the form of CW radiant energy is supplied from supply source means 19 via sequential pathways 11 and 14 to termination point 23. Interrupter 41 includes reflection means to efficiently reflect at least a portion of the radiant energy back along pathway 14 (as described) to reverse beam deflection mirror 13, which redirects the pulsating radiant energy reflected by interrupter 41 to signal detector 18, via pathway 15, for determining the oscillator 20 frequency.

Figure 5:
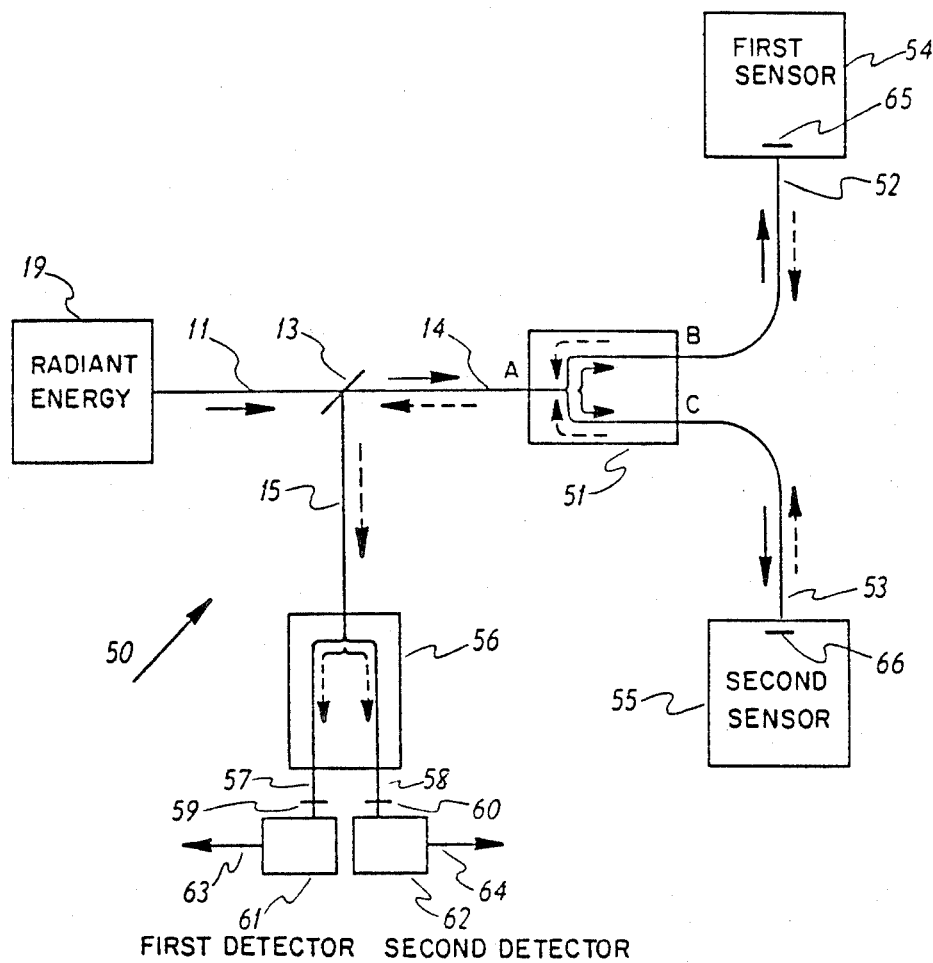
FIG. 5 is a simplified schematic view of a dualresonator sensor according to an alternate embodiment of applicant's invention.

One embodiment of the present invention comprehends the use of a plurality of signals on the single fiber optic path in the manner shown by the dual-resonator sensor 50 of FIG. 5. The elements of such a dual resonator sensor 50 include energy source supply means 19, steady (CW) radiant energy pathway 11, reverse beam deflection mirror 13, first two-way radiant energy pathway 14, first deflected pulsating radiant energy pathway 15, sensor beam splitter/combiner 51, second two-way radiant energy pathway 52, third two-way radiant energy pathway 53, first sensor 54 and second sensor 55, detector beam splitter 56, second and third pulsating radiant energy pathways 57 and 58, first and second detector wavelength filters 59 and 60, first and second detectors 61 and 62 and their respective first and second output signals 63 and 64, and first and second sensor wavelength filters 65 and 66.

Figure 7:
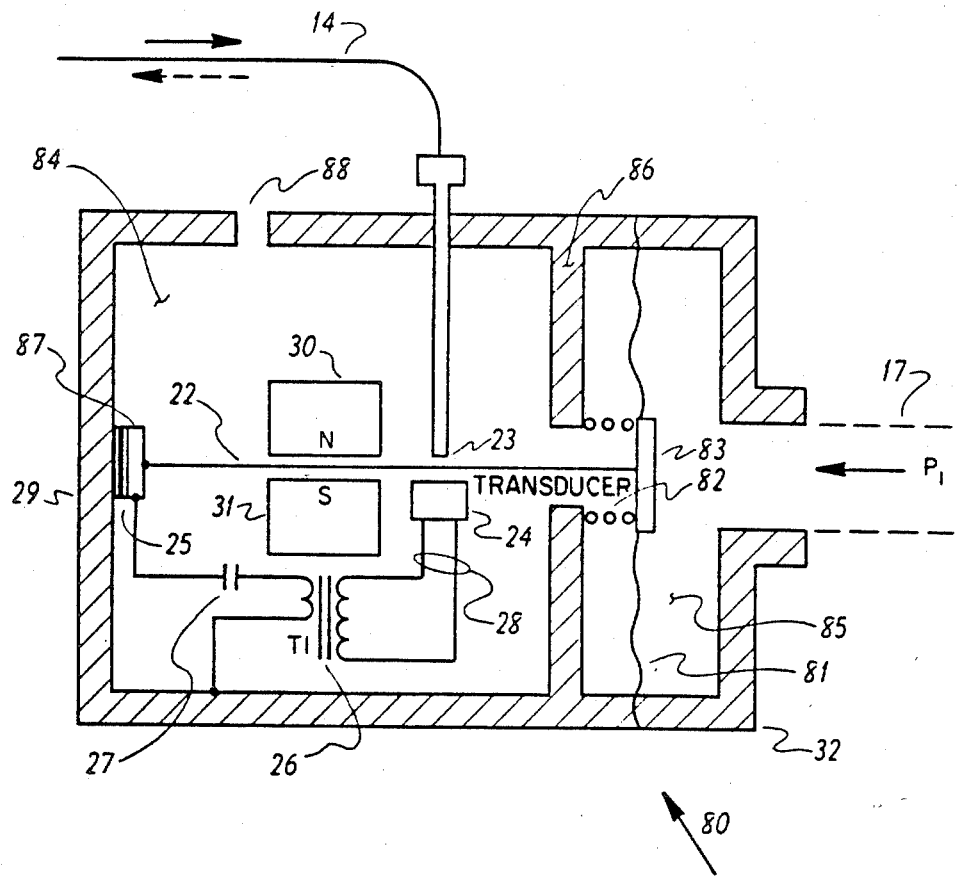
FIG. 7 is a simplified schematic view of a pressure cell configuration of the present invention.

In the dual sensor unit of FIG. 5, the sensor splitter/combiner 51 diverts the input, steady CW radiant energy at port A into two (or more) radiant energy signals following separate output paths. (The sensor splitter/combiner 51 is discussed in greater detail hereinafter.) The splitter/combiner output ports B and C thus are separated one from the other. The two-way pathways 52 and 53 conduct the radiant energy to sensors 54 and 55. In each sensor 54, 55, a separate wavelength filter 65, 66 is shown disposed between the end of the fiber optic path (51, 53) and the mirrored, or reflecting surface. (Examples of double-wavelength filtering are illustrated in FIG. 7 and described hereinafter in association with FIG. 7.) Alternative to discrete filters, the mirrored or reflective areas of one or more extremely thin, wavelength specific sensitive coatings to restrict the wavelength of the reflected signal. Each separate filter element 65, 66 (or coated mirror surface) is specific to a different wavelength and restricts the wavelength of radiant energy returned. Sensors 54 and 55 are similar to oscillator means 20 previously described, except that the filters 65 and 66 (or coated mirror surfaces) restrict the wavelength of radiant energy returned so that a particular (and different) wavelength is associated with each sensor 54, 55. The output 63, 64 of each respective detector 61, 62 is related to the physical magnitude being measured.

The beamsplitter 51 represents an optical device for dividing a beam into two or more separate beams. Examples of simple beam splitters include: (1) a thin sheet of light transmitting glass, often partially reflectively coated, as by metallization for example, inserted in a beam at an angle to divert a portion of the beam in a different direction; and (2) two right-angle prisms cemented together at their hypotenuse faces, in which one of coated. When a beam is passed therethrough, portions of the beam energy are deflected at angles determined by the position of the prism surfaces and the direction of the indicator light. Alternatively, more than one smaller optical fiber may receive energy from at least one larger optical fiber, dividing the energy from the larger fiber into the smaller fibers. Any of the known light-or radiant-energy splitters and/or splitter/combiners equivalent in function to the foregoing may be substituted therefor; the example described here is given for illustrative purposes only.

Figure 6:
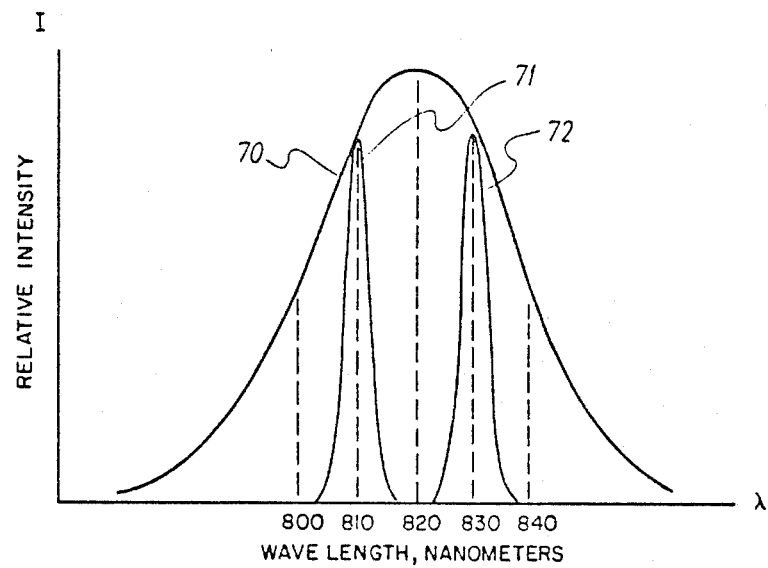
FIG. 6 shows the spectral distribution of a portion of the radiant energy usable with the present invention and showing two discrete usable bandpass curves.

Turning now to FIG. 6, there is shown a spectral distribution curve 70 of an IR (Infrared) LED (light-emitting diode), superimposed on which are separate bandpass response curves 71, 72, of two discrete wavelengths of radiant energy within the spectral output of the LED. The bandpass curves 71, 72 shown are the product of multilayer radiant energy reflective or transmission coatings. Use of reflective coatings is preferred as it is more radiant energy efficient. In the present case, the curves 71, 72 are of radiant energy which has been passed through filters such as those shown in FIG. 5 (59, 60, 65, 66). Further selectivity (i.e., a narrower response curve) can be achieved by providing the resonant element with multilayer radiant energy reflective mirror coatings or elements, thus permitting multiple sensor return signals on a single fiber optic pathway.

FIG. 7 illustrates an embodiment of the invention for implementing the concept of a pressure sensor 80 and includes two-way radiant energy pathway 14, force conversion communication means 17, which in this case is a pressure communications means such as a pipe or tubing, resonant element 22, fiber optic pathway termination 23, radiant energy to electrical energy transducer 24, insulator 25, transformer 26, phase shifter means 27, electrical interconnect means 28, end support structure 29, magnetic field source means (North) 30 and (South) 31, frame 32, diaphragm 81 having a reinforced and/or strengthened central area 83, preload spring 82, first chamber 84, pressure chamber 85, partition 86, and port 88.

In the embodiment of FIG. 7, the resonant element 22 is a wire or ribbon stretched between end support structure 29 and diaphragm 81 which seals first chamber 84 from pressure chamber 85. The central area 83 is diaphragm 81 is reinforced for attachment of the resonant element 22 which is maintained under tension by preload spring 82 urging the diaphragm away from partition 86. The resonant element 22 is disposed between optical pathway termination 23 and transducer 24 so as to at least partially block the path between the two. Pressure ($P_1$) is communicated to the pressure chamber 85 via communication means 17. Magnets 30 and 31 provide a magnetic field which, when resonant element 22 is electrically energized, causes resonant element 22 to move back and forth between the permanent magnet pole faces in a direction perpendicular to both the direction of current flow in the resonant element and the magnetic field.

When configured in an operating system, the diaphragm 81 of pressure sensor 80 is subjected to a pressure $P_1$ which represents the physical magnitude to be measured. $P_1$ presses against diaphragm 81 and its control area 83 in proportion to the pressure $P_1$, effecting a change in the tension on resonant element 22, and therefore, its resonant frequency varies in relation to pressure $P_1$. The resonant element is caused to oscillate or vibrate at a determinable frequency, by an electrical signal derived from radiant energy conducted via pathway 14 from a remote radiant energy supply source (not shown) to pathway termination point 23. As radiant energy (which may be in the form of light energy) strikes transducer 24, the resonant element 22 receives an electrical signal via transformer 26 which causes the resonant element 22 to move (under the influence of the magnetic field provided by magnets 30, 31) in and out of the light pathway between termination point 23 and transducer 24, shuttering the light reaching transducer 24 at a regular rate, the frequency of which depends on the tension applied to the resonant element 22 by diaphragm 81. The resonant element 22 is a metallic ribbon having a reflective surface or the equivalent. In order to feed back the resonating frequency of the ribbon, the light is reflected in a modulated fashion during shuttering back along the same pathway 14 on which it arrived and is detected remotely according to the description previously given above. An outside port 88 is required if gauge pressure is to be measured; the unit may be evacuated and the port 88 sealed if absolute pressure is to be measured.

Figure 8:
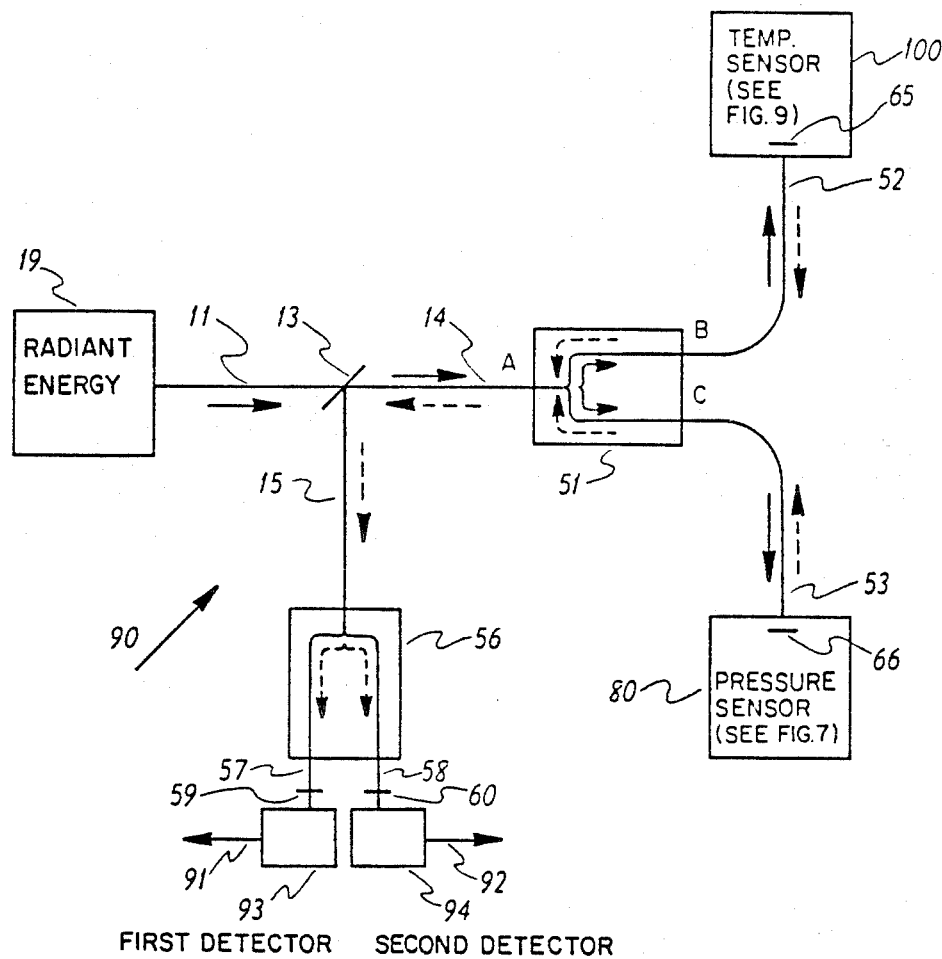
FIG. 8 is a simplified view of a temperature compensated presure sensor configuration of the present invention.

The apparatus of the invention may also measure temperature. This may be done in several ways, and selection of these options often depends on the use to which the temperature measurement is to be put. For example, a gas-filled bulb (e.g., 121 of FIG. 11) may be connected to apparatus as described above in connection with FIG. 4 and the pressure variations sensed as there described. The same gas-filled bulb apparatus may be used to pressurize the interior of a cavity, such as is described in FIG. 8, to sense temperatures. It is often particularly advantageous to know the degree to which temperature affects the resonating frequency of the resonating element 22, in order to identify the accuracy of the measurement. FIG. 8 illustrates a common such situation, wherein pressure is remotely measured; the temperature at the pressure sensor site must be measured to identify the presence and degree of temperature caused variations in determining the pressure measurement accuracy.

Figure 9:
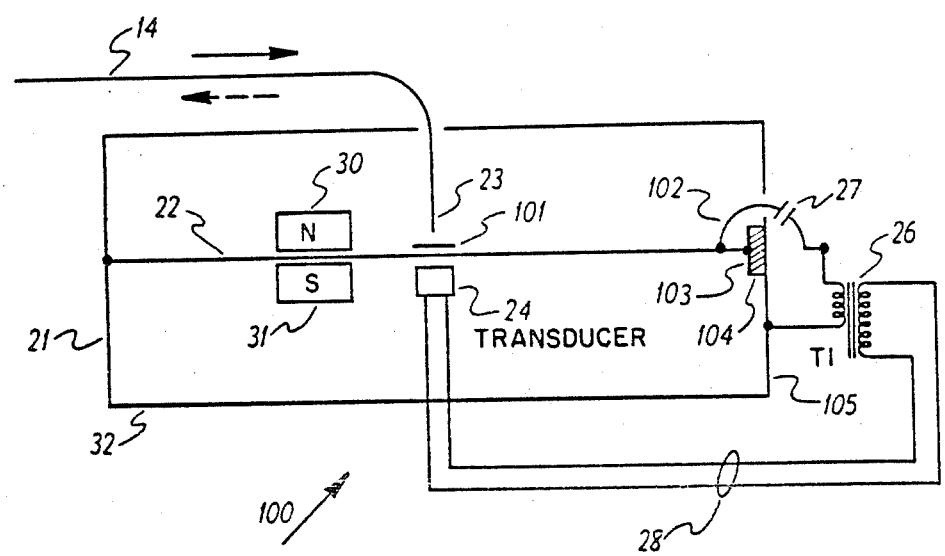
FIG. 9 is a simplified schematic view of a temperature sensor according to the present invention.

Measuring temperature and pressure in FIG. 8 is accomplished with a dual sensor configuration of a temperature compensated pressure sensor 90, including radiant energy source supply means 19, steady (CW) radiant energy pathway 11, reverse beam deflection splitter 13, first two-way radiant energy pathway 14, first deflected pulsating radiant energy pathway 15, sensor beam splitter/combiner 51 (see FIG. 5 discussion), second two-way radiant energy pathway 52, third two-way radiant energy pathway 53, detector beam splitter 56, second pulsating radiant energy pathway 57, third pulsating radiant energy pathway 58, first detector wavelength filter 59, second detector wavelength filter 60, first sensor wavelength filter 65, second sensor wavelength filter 66, pressure sensor 80 (see FIG. 7 discussion, above), temperature detector 93 and its output signal 91 (FIG. 8), pressure detector 94 and its pressure output signal 92, and temperature sensor 100 (FIG. 9 discussion).

The temperature compensated pressure sensor 90 is essentially the same as dual resonator sensor 50 of FIG. 5, save for the use of specific temperature and pressure sensors 100, 80. Pressure sensor 80 is described above; temperature sensor 100 (substantially the same as oscillator means 20, previously described) is illustrated in FIG. 9 and described hereinafter. As in FIG. 5, two separate signals representing physical parameters in sensors 80 and 100, respectively, are developed, using a single radiant energy source means (not shown) as the energy supply source conducted along a single pathway. The two signals, here pressure and local temperature at the pressure sensor location, are developed as two signals of different wavelengths and returned along the same single fiber optic pathway 14 to be separately detected, providing a temperature related signal which can be electronically related to the pressure signal and used to reduce the temperature caused pressure signal error.

FIG. 9 shows schematically a simpel temperature sensor 100 particularly suitable for use in measuring the ambient temperature within an enclosure containing one or more other sensors measuring temperature-affected physical magnitudes, such as pressure. Included elements are: two-way radiant energy pathway 14, end support structure 21, resonant element 22, fiber optic pathway termination 23, radiant energy to electrical energy transducer 24, transformer 26, phase shift means (resistor) 27, electrical interconnect means 28, magnetic field source means 30 (N) and 31 (S), frame 32, reflector 101, jumper 102, and mount 103, electrical insulator 104, and end support structure 105.

The resonant element 22 is suspended under tension between first and second end support structures 21, 105 and electrically isolated by insulation 104 at end support 105. A connection to end mount 103 enables securing the resonant element 22 to insulator 104 and end support 105. Phase shift means 27 are included to adjust the phase of the driving power within the desired range (0° to 180°). A flexible electrical conductor connects the insulated end of resonant element 22 to the transformer 26 secondary winding. Reflector element 101 is optional; it is provided to improve reflectivity of the resonant element 27 when such lacks sufficient light reflectivity or when greater light efficiency is required. By selecting resonant element 22 and frame (base or housing) 32 of material shaving different temperature coefficients, local temperature can be accurately measured. The resonant ribbon 22 itself remains frequency independent of temperature. In multiple sensor use as discussed above in connection with FIG. 5, the mirror surface may be coated with one or more radiant energy frequency selective coatings to limit the frequency response of the returned, shuttered energy. The remaining parts and elements function exactly as the substantially similar apparatus of FIG. 3 (described above), except for the foregoing differences.

Figure 10:
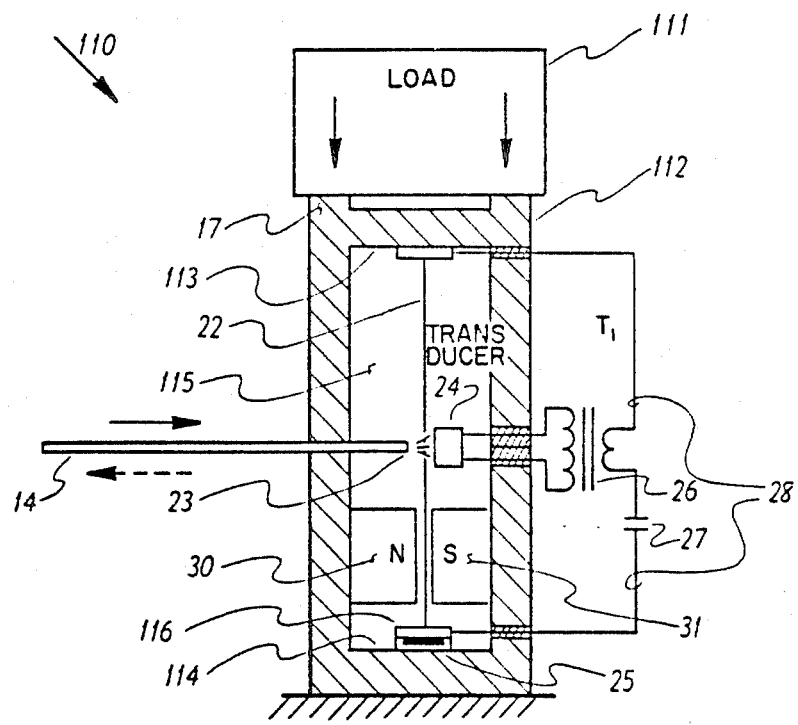
FIG. 10 is a simple load cell configuration of the present invention in schematic view.

The improved fiber optic remote sensor is ideally adaptable to a load cell sensor 110 configuration as is shown in FIG. 10, which includes two-way radiant energy pathway 14, force conversion communication means 17, resonant element 22, fiber optic pathway termination 23, radiant energy to electrical energy transducer 24, electrical insulator 25, transformer 26, phase shift means 27, electrical interconnect means 28, magnetic field (North) means 30, and (South) 31, load 111, load cell housing 112, first end wall 113, second end wall 114, chamber 115, and end mount 116.

In this configuration, the sensor operates substantially the same as previously described in association with FIG. 3, except that the physical magnitude sensed is a pressure applied directly to the integral load cell housing 112 (and conveyed to the housing 112 as a whole rather than to end wall 113) by force conversion means 17, which is a a rim or lip 17. In this drawing, load 111 is shown schematically as a mass acted upon by gravity. The rim or lip 17 of the load cell 110 may be an integral portion of the housing 112 or a completely separate piece. Its function is to transfer the load force applied to the side walls of the housing 112 rather than to end wall 113, which could result in a spurious or uncalibrated output reading. It should be noted that since the sensor measures the force applied by the load, as a frequency change rather than as an absolute frequency measurement per se, the load cell may be arranged in any attitude or position and still accurately measure the force applied with little or no discrepancy related to that position or attitude.

Figure 11:
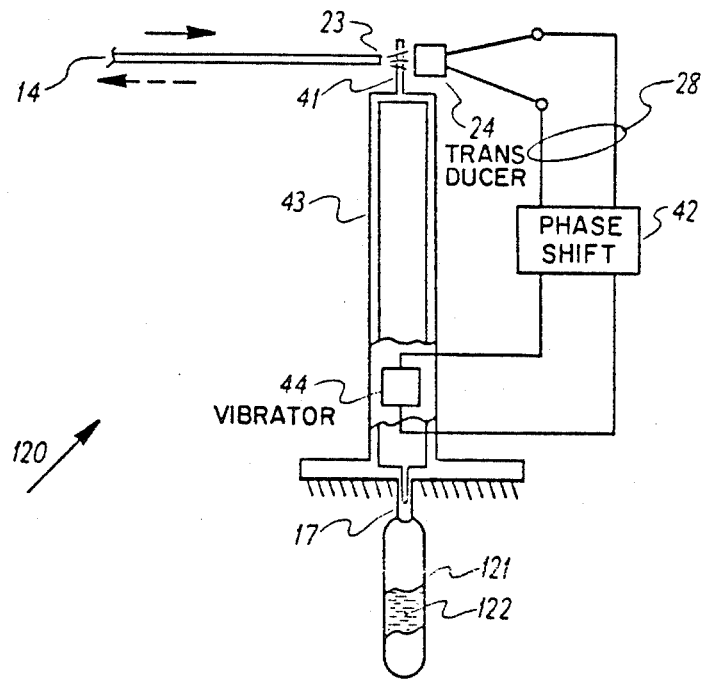
FIG. 11 illustrates a resonant hollow beam temperature sensor.

FIG. 11 is a simplified schematic view of a fluid-filled bulb, resonant cavity temperature sensor 120 according to another embodiment of this invention, and which sensor includes two-way radiant energy pathway 14, force communication means 17 (shown in partial section) which in this case is a pressure communication means, fiber optic pathway temrination 23, radiant energy to electrical energy transducer 24, electrical interconnect means 28, reflecting interruptor 41, phase shift circuit 42, resonant hollow beam element 43 (shown in partial section), vibrator means 44, and fluid filled, temperature responsive container 121, which contains a temperature responsive fluid 122. Conventional filled vapor pressure techniques may be used to avoid temperature effects of the fill fluid.

Operation in this configuration is substantially similar to that described for the basic sensor oscillator means 40 in association with FIG. 4, save for the specific force conversion means, a fluid filled, temperature responsive fluid container 121, which may contain any suitable temperature responsive fluid 122, whether gas or liquid. In this arrangement, the force conversion communication means 17 may be a tube, or a capillary tube, connected between the hollow beam resonant element 43 and the temperature responsive fluid container 121, which may be bulbous in shape as desired. Temperature changes affecting container 121 expand or contract the fluid contained therein. The fluid expansion is communicating to the cavity of hollow beam resonant element 43, and causes the resonant frequency thereof to change.

Figure 12:
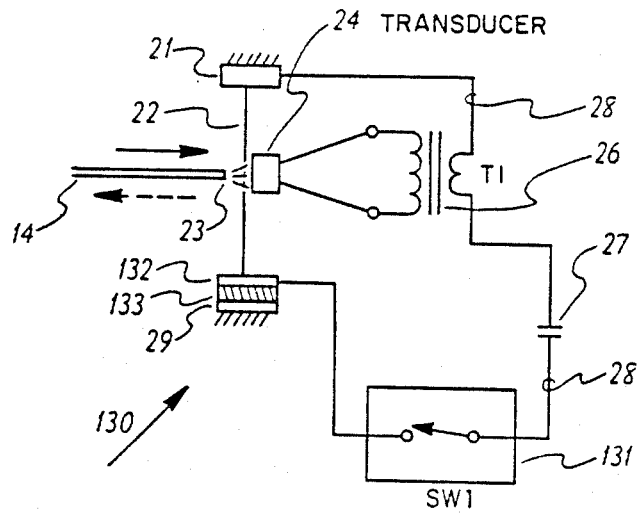
FIG. 12 is a simplified view of an alternate embodiment of the invention in which an electrical switch is incorporated in combination with the sensor.

Although the invention has been described as having optically supplied opeative energy and being optically sensed, it is clear that the electromechanical drive portion of the oscillator can be interrupted if desired to stop the oscillations. FIG. 12, a simplified schematic view, illustrates an embodiment of the invention adapted to certain uses in which low level electrical signals are available for further electrical signal communication, and includes two-way radiant energy pathway 14, end support structure 21, resonant element 22, fiber optic pathway termination 23, radiant energy to electrical energy transducer 24, transformer 26, phase stabilizer means 27, electrical interconnect means 28, end support structure 29, switch 131, end mount 132, and insulator 133.

Figure 13:
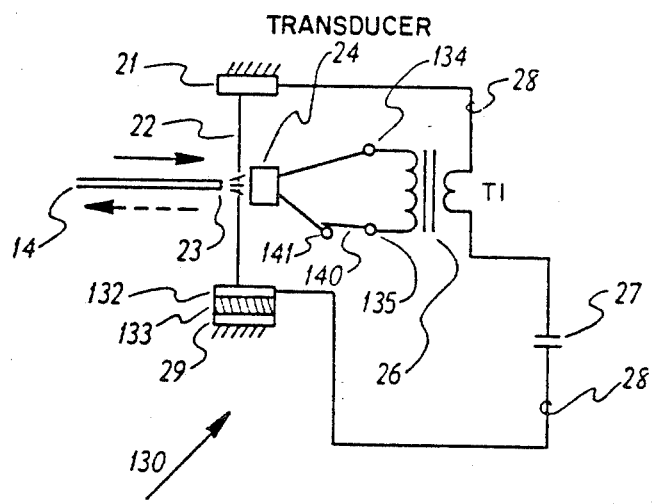
FIG. 13 is a simplified view of an embodiment in which either optical or electrical drive may be used.

End mount 132 and insulator 133 are as previously described in connection with items 25 and 87 (FIG. 3 and 7). Except for switch 131, the remaining elements are as described in FIG. 3. Switch 131 (SW$_1$) is capable of interrupting the feedback signal electrical signals, and as such it is an excellent means to start and stop them. As a sealed magnetic responding reed switch, it makes an ideal limit switch or other oscillation interrupter. Two or more normally closed devices may be connected in series with switch 131, or two or more normally open switch devices may be connected in parallel with switch 131 to provide multiple interruption functions. Additional switches located at other positions may be useful in various range identification or position location and reference uses. Alternatively, an electrical signal may be derived directly from terminals 134, 135, as in FIG. 13, and used for further electrical communication; this is ordinarily a low-level signal. The embodiment of FIG. 13 is substantially similar to that of FIG. 12, save for the elimination of the switch (S1) 131 of FIG. 12 and the inclusion of electrical contacts 134, 135 in FIG. 13 to enable direct electrical and/or optical powering/ sensing of the apparatus. These electrical contacts may also be used for detection, local indication and/or calibration purposes. The same is true in many of the other embodiments of the invention described herein. When used in the electrical operating mode, strap 140 between terminals 141 and 135 can be cut to avoid loading by the transducer. A switch may be substituted for strap 140.

Figure 14A:
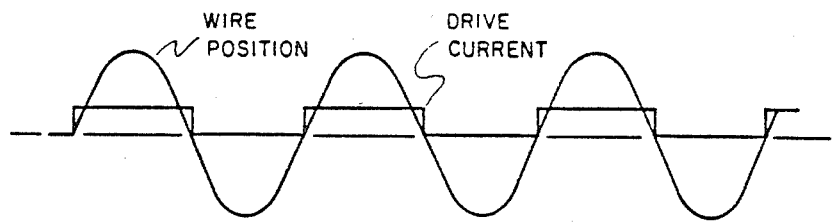
Figure 14B:
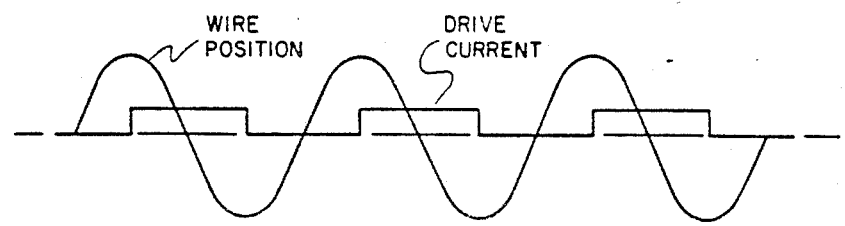

Turning finally to FIG. 14, two views of the wire position and the drive current are shown in which the relative phase of the currents is correct in FIG. 14B and shifted by 90° (incorrect in FIG. 14A). Stable operation is illustrated by FIG. 14B. Drive current is only available when the reflective portion of the resonant element does not prevent the light from reaching the transducer.

We claim:
1. Self-sustaining resonant oscillator apparatus energized solely by radiant energy carried by an optical pathway, comprising:
 (a) vibratable mechanical resonator;
 (b) motive means for vibrating said mechanical resonator;
 (c) single optical pathway means for communicating radiant energy from a first point to a second point;
 (d) radiant energy source means located apart from said resonant element apparatus, said radiant energy source means providing radiant energy to said optical pathway at said first point;

(e) terminal end means for terminating said optical pathway at the second point, located adjacent said resonant element, such that the radiant energy exiting said optical pathway is directed toward said resonant element;

(f) transducer means for converting optical energy to electrical energy, located opposite said resonant element from said terminal end of said optical pathway, in which the transducer, resonant element, and terminal end means are displaced one from the other with the resonant element positioned at least partially between said terminal end means and said transducer means;

(g) electrical communications means for communicating electrical current from said transducer means to said motive means;

wherein said motive means for vibrating said resonant element is energized solely by said transducer means, and said resonator means is vibrated transversely back and forth between said transducer means and said terminating end means such that radiant energy exiting the terminating end means is first at least partially blocked from reaching said transducer means and alternately strikes said transducer means.

2. An oscillating resonant element measurand sensor apparatus energized solely by unmodulated radiant energy carried by a single optical pathway, comprising:

(a) a mechanical resonator subjected to a stress force, said stress force being related to said measurand, said resonator having reflective means for reflecting radiant energy at a location on the surface thereof;

(b) motive means for vibrating said mechanical resonator;

(c) optical pathway means for communicating radiant energy from a first point to a second point in a first direction;

(d) radiant energy source means located apart from said resonant element apparatus, said radiant energy source means providing radiant energy to said optical pathway at said first point, wherein the radiant energy provided by the radiant energy source means is substantially steady and unmodulated;

(e) terminal end means terminating said optical pathway at said second point, located adjacent sad mechanical resonator such that radiant energy exiting said optical pathway is directed toward said mechanical resonator at said reflective location;

(f) transducer means for converting radiant energy to electrical energy, located opposite said mechanical resonator from said terminal end of said optical pathway, in which the transducer, mechanical resonator, and terminal end means are displaced one from the other with the mechanical resonator positioned at least partially between said terminal end means and said transducer means;

(g) electric communication means for communicating electrical current from said transducer means to said motive means, for initiating vibratory motion of the mechanical resonator; and (h) radiant energy modulation detection means located along said radiant energy optical pathway means apart from said first point;

wherein vibratory motion of said mechanical resonator modulates said radiant energy incident on said transducer means to produce electrical current modulated at said resonant frequency to energize said motive means and said mechanical resonator motion positions said reflection means such that at least a portion of the radiant energy is reflected back along said optical pathway in a second direction towards said first point ot said radiant energy modulation detection means for determination of said measurand.

3. The oscillating resonant element sensor apparatus according to claim 2, wherein the mechanical resonator subjected to a stress force is a ribbon.

4. The oscillating resonant element sensor apparatus according to claim 2, wherein the mechanical resonator subjected to a stress force is a resonant hollow beam structure.

5. The oscillating resonant element sensor apparatus according to claim 4, wherein the resonant hollow beam structure is cantilevered.

6. The oscillating resonant element sensor apparatus according to claim 2, wherein the radiant energy provided by the radiant energy source means is of a wavelength between $10^3$ and $10^5$ Angstroms.

7. The oscillating resonant element sensor apparatus according to claim 6, wherein the radiant energy provided by the radiant energy source means is preferably of a wavelength between about 1,000 and about 4,000 Angstroms.

8. The oscillating resonant element sensor apparatus according to claim 6, wherein the radiant energy provided by the radiant energy source means is preferably of a wavelength between about 4,000 and about 7,000 Anstroms.

9. The oscillating resonant element sensor apparatus according to claim 6, wherein the radiant energy provided by the radiant energy source means is of a wavelength between about 7,000 and about 100,000 Angstroms.

10. The oscillating resonant element sensor apparatus according to claim 2, wherein the radiant energy provided by the radiant energy source means is incoherent.

11. The oscillating resonant element sensor apparatus according to claim 2, wherein the radiant energy provided by the radiant energy source means is coherent.

12. The oscillating resonant element sensor apparatus according to claim 2, wherein the optical pathway means comprises a single fiber optic radiant energy passageway.

13. The oscillating resonant element sensor apparatus according to claim 2, wherein the optical pathway elements along a unitary path.

14. The oscillating resonant element sensor apparatus according to claim 2, further including transformer impedance matching means having at least first and second windings, wherein the transducer output current is coupled to said first winding and said motive means are connected to said second winding.

15. The oscillating resonant element sensor apparatus according to claim 14, further comprising phase shift means to cause the motive current to drive the resonant element with the correct phase.

16. Oscillating resonant element sensor apparatus according to claim 2, wherein the motive means thereof comprises:

(a) magnetic force bias means for creating a magnetic field around said mechanical resonator;

(b) means for communicating the transducer electrical current output to the respective ends of said mechanical resonator and for passing transducer output current therethrough for generating an electromagnetic field;

whereby the mechanism for inducing movement of the mechanical resonator between said transducer means and said radiant energy terminal end means is by interaction of said magnetic force bias means and said electromagnetic field.

17. Oscillating resonant element sensor apparatus according to claim 4, wherein the motive means thereof comprises piezoelectric vibrator means for converting electrical energy to mechanical movement of the resonant element.

18. In a self-sustaining resonant oscillator apparatus energized solely by radiant energy carried by a single pathway, and which includes a vibratable mechanical resonator, motive means for vibrating said mechanical resonator, and single fiber optic pathway means for communicating radiant energy from a first point to a second point, the method of energizing said oscillator which comprises:
 (a) generating unmodulated radiant energy at a radiant energy source apart from said resonant oscillator,
 (b) introducing said radiant energy into said optical pathway at a first end thereof;
 (c) directing radiant energy from a terminal point at the second end of said optical pathway onto a transducer, the space between said transducer and said terminal point including a vibratable mechanical resonator;
 (d) generating power via said transducer to energize said motive means; and
 (e) vibrating said mechanical resonator via said motive means such that said mechanical resonator alternately at least partially passes and shutters radiant energy passing between said terminal point and said mechanical resonator.

19. In an oscillating resonant element measrand sensor apparatus energized solely by unmodulated radiant energy carried by a single optical pathway, the measurand sensing method comprising:
 (a) subjecting a source end of a radiant energy pathway means to a steady beam of such radiant energy;
 (b) communicating said steady radiant energy along said pathway in a first direction to a self-sustaining resonant oscillator device;
 (c) alternately using only said communicated radiant energy to intermittently drive the resonant element in an oscillatory mechanical vibration mode and to reflect at least a portion of the radiant energy partially along said pathway in a second, reverse direction, wherein electrical energy is derived from the radiant energy by a transducer during periods when the radiant energy is not bein reflected and is used to sustain oscillation of said resonant element; and
 (d) detecting the reflected radiant energy variations and relating same to the measurand.

20. The method according to claim 19 in which the resonant element is caused to vibrate mechanically through the interaction of an electromagnetic field and a substantially fixed magnetic field.

21. The method according to claim 19 in which the resonant element is caused to oscillate by subjecting same to mechanical stress caused by directly applying an electrical field to a piezoelectric element.

22. In an oscillating resonant element measurand sensor apparatus energized solely by unmodulated radiant energy carried by a single optical pathway, including plural resonant elements subjected to stress forces related to measurands, radiant energy drive source, and means to return a plurality of signal values related to the stress forces, the method comprsiing:
 (a) subjecting a source end of a radiant energy pathway means to a steady beam of radiant energy which includes a plurality of wavelengths including at least first and second wavelengths,
 (b) communicating said steady beam of radiant energy along said pathway in a first direction to a splitter, said splitter dividing the radiant energy into a plurality of discrete paths,
 (c) communicating the radiant energy from at least one of said plurality of discrete paths to a resonant element device, and
 (d) alternately using only said communicated radiant energy to intermittently drive at least one resonant element in an oscillatory mechanical vibration mode and reflecting energy of a wavelength selected from at least a portion of the radiant energy along at least a portion of said pathway in a second, reverse direction wherein electrical energy for energizing the sensor is derived from the radiant energy by a transducer during periods when the radiant energy is not being reflected and is used to sustain oscillation of said resonant element; and
 (e) detecting the reflected radiant energy variations and relating same to the measurand.

23. The method according to claim 22 in which the resonant element is caused to oscillate through the interaction of an electromagnetic field in a substantially fixed magnetic field.

24. The method according to claim 22 in which the resonant element is caused to oscillate by subjecting same to mechanical stress caused by directly applying an electrical field to a piezoelectric element.

25. The method according to claim 22 in which the reflected radiant energy is selectively diverted by wavelength and detected to indicate the stress forces and thus the measurand values.

26. An oscillating resonant element measurand sensor apparatus energized solely by unmodulated radiant energy carried by a single optical pathway for a portion of the pathway length, for remotely sensing a plurality of stress forces related to at least one measurand, comprising:
 (a) radiant energy source means located apart from said resonant element sensor apparatus, said radiant energy source means providing radiant energy to said optical pathway at said first point, wherein the radiane energy provided by the radiant energy source means is substantially steady and unmodulated;
 (b) a plurality of vibratable mechanical resonators subjected to at least two stress forces related to at least one measurand, disposed apart from said radiant energy source means;
 (c) single communicating optical pathway means to channel the radiant energy in a first direction from said radiant energy source means;
 (d) means to divide said single communicating pathway into a plruality of communicating pathways each of a separate wavelength;
 (e) terminating end point means associated with each of said resonators for terminating a radiant energy pathway adjacent each of said resonators;
 (f) plural communicating pathway means for communicating radiant energy to the corresponding individual terminal points adjacent each of said resonator elements;

(g) individual transducer means associated with each pathway and each terminating point, adjacent each of said resonator elements and opposite the respective corresponding terminating point, for generating electrical power from the radiant energy emanating from the respective corresponding terminating point;

(h) individual electric motive means for inducing movement of each resonator element transversely between its corresponding transducer and respective terminating point to shutter the radiant energy reaching the transducer at frequencies related to the stress forces;

(i) a reflective surface on each of said resonator elements for modulating the radiant energy by reflecting at least a portion of the radiant energy back along at least a portion of the communicating pathway in a second direction opposite said first direction, (j) means for selectively separating the radiant energy returned from each of said resonant elements by wavelength; and (k) means for detecting the modulation frequency of the returned radiant energy associated with each of said resonant elements.

27. Sensor apparatus as in claim 26, wherein means for selectively separating the radiant energy by wavelength comprises a wavelength-selective filter element through which the radiant energy from the respective resonant element passes.

28. Sensor apparatus as in claim 26, wherein said means for selectively separating the radiant energy by wavelength comprises a different wavelength-selective coating on the reflective surface of each respective resonant element.

29. Sensor apparatus according to claim 3 for sensing a fluid pressure force in which said resonant ribbon element includes first and second ends, and further comprising:

housing means forming a rigid enclosure having at least one end wall within an enveloping enclosure having at least one side wall perpendicular to and joined with said end wall;

a pressure diaphragm spaced apart from said end wall, said diaphragm including mounting means attached to a first end of said resonant ribbon elemetn and defining within said enclosure first and second cavities such that said first cavity is substantially sealed and includes said end wall, an atmospheric vent, and at least a portion of said side wall, and said second cavity is sealed from said first cavity; and source means of fluid pressure force for communicating the pressure force to said second cavity and to said diaphragm;

characterized in that said resonant ribbon element second end is attached to the interior surface of said end wall of the enclosure within the first cavity, and whereby the longitudinal tesnion on said resonant ribbon is varied in relation to the pressure force applied to said diaphragm.

30. Sensor apparatus according to claim 29 for measuring absolute pressure in which the first cavity is evacuated and tightly sealed.

31. Sensor apparatus according to claim 29 for measuring gauge pressure in which the first cavity is vented to the atmosphere.

32. Sensor apparatus according to claim 3 for sensing temperature, further including a housing enclosure having opposing first and second ends to which the resonant ribbon element ends are attached, further characterized in that the housing enclosure structure has a different expansion temperature coefficient than that of the ribbon element.

33. Sensor apparatus according to claim 3 for sensing mechanical pressure force in which said resonant ribbon element includes first and second ends, and further comprising:

first and second end walls and at least one contiguous side wall surrounding a longitudinal axis perpendicular to and between said ends, and forming an enclosure having interior surfaces;

spacer means interposed between said at least one contiguous sidewall and the mechanical pressure force, for separating said mechanical pressure force from the respective end wall and for communicating only the mechanical pressure force to said at least one contiguous side wall, said force being communicated coaxial with said longitudinal axis; and attachment means for securing the first and second ends of said resonant ribbon element under tension to the interior of said first end wall and said second end wall.

34. Sensor apparatus according to claim 4, including a resonant hollow beam structure having an internal cavity for sensing a fluid pressure force by communicating with said fluid pressure force, further including a vapor in equilibrium separating the fluid pressure force source and the resonant hollow beam internal cavity.

* * * * *